United States Patent
Liang et al.

(10) Patent No.: US 9,824,708 B2
(45) Date of Patent: Nov. 21, 2017

(54) SPIRAL WRITE LAUNCH WHILE SERVOING ON REFERENCE GUIDE SPIRALS

(71) Applicant: KABUSHIKI KAISHA TOSHIBA, Tokyo (JP)

(72) Inventors: Jiangang Liang, San Jose, CA (US); Gabor Szita, Mountain View, CA (US); Tony Huang, San Jose, CA (US); Gary W. Calfee, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 241 days.

(21) Appl. No.: 14/675,482

(22) Filed: Mar. 31, 2015

(65) Prior Publication Data

US 2016/0293192 A1    Oct. 6, 2016

(51) Int. Cl.
G11B 5/596 (2006.01)
G11B 20/12 (2006.01)
G11B 5/55 (2006.01)

(52) U.S. Cl.
CPC ...... G11B 5/59661 (2013.01); G11B 5/59666 (2013.01); *G11B 5/5543* (2013.01); *G11B 20/1217* (2013.01); *G11B 2020/1238* (2013.01); *G11B 2020/1281* (2013.01)

(58) Field of Classification Search
CPC .............. G11B 5/5543; G11B 5/59633; G11B 5/59661–5/59666; G11B 20/1217; G11B 2020/1238; G11B 2020/1281
USPC ......................................... 360/48, 55, 69, 75
See application file for complete search history.

(56) References Cited

U.S. PATENT DOCUMENTS

| | | | |
|---|---|---|---|
| 7,414,809 B2 * | 8/2008 | Smith ............... | G11B 5/59661 360/77.08 |
| 7,764,457 B1 * | 7/2010 | Neos ................. | G11B 5/59661 360/75 |
| 7,995,305 B1 * | 8/2011 | Ton-That ............ | G11B 5/5534 360/75 |
| 8,077,422 B1 | 12/2011 | Ton-That et al. | |
| 8,208,216 B1 * | 6/2012 | Neos ................. | G11B 5/59661 360/75 |
| 8,462,458 B1 | 6/2013 | Ton-That et al. | |
| 8,537,486 B2 | 9/2013 | Liang et al. | |
| 8,634,283 B1 | 1/2014 | Rigney et al. | |
| 8,681,450 B1 * | 3/2014 | Ton-That ........... | G11B 5/59661 360/75 |
| 8,687,308 B1 * | 4/2014 | Katchmart ......... | G11B 5/59661 360/51 |
| 8,767,340 B1 * | 7/2014 | Neos ................. | G11B 5/59661 360/61 |
| 9,076,490 B1 * | 7/2015 | Nie .................... | G11B 5/59661 |

(Continued)

*Primary Examiner* — Wayne Young
*Assistant Examiner* — James L Habermehl
(74) *Attorney, Agent, or Firm* — Patterson & Sheridan, LLP (57) ABSTRACT

A reference spiral is written on a recording surface of a hard disk drive. By launching writing of fine guide spirals from a launch point that is disposed on a pre-existing coarse guide spiral, writing of the fine guide spiral can be launched in response to a write head crossing the pre-existing coarse guide spiral, rather than in response to a precisely timed event. To enable launch points being disposed on pre-existing coarse guide spirals, launch points are not all located at the same radial position on the recording surface.

20 Claims, 6 Drawing Sheets

(56) References Cited

U.S. PATENT DOCUMENTS

2009/0086357 A1* 4/2009 Ehrlich ............... G11B 5/5965
  360/55
2013/0038959 A1 2/2013 Liang et al.

* cited by examiner

SPIRAL WRITE LAUNCH WHILE SERVOING ON REFERENCE GUIDE SPIRALS

BACKGROUND

In a typical hard disk drive (HDD) data storage device, servo sectors on the disk are used to provide position information about the location of a magnetic head over a disk surface. A common approach for writing such servo information on the disk is referred to as spiral-based self servo writing, or spiral-based SSW. According to this approach, spiral-shaped positioning signals (or "servo spirals") are written on the disk surface prior to the SSW process. During the SSW process, each magnetic head of the HDD is positioned relative to a disk surface based on the servo spirals, so that the final servo information on each disk surface can be written by the disk drive heads.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD writes servo spirals itself prior to performing the SSW process. High quality servo spirals are evenly spaced circumferentially from each other, and when servo spirals are self-written by the HDD, the accuracy of such circumferential spacing can be strongly dependent on an accurately implemented launch point when the HDD begins writing each servo spiral. Accurate launch points for writing servo spirals can be achieved by precisely timed initiation of servo spiral writing. However, schemes that rely on precise timing for launching servo spirals correctly can be problematic to implement and/or require specialized hardware. Accordingly, there is a need in the art for a method of generating accurate servo spirals on a disk surface of an HDD without the use of external equipment.

SUMMARY

One or more embodiments provide systems and methods for in-drive writing of servo spirals on a recording surface of a hard disk drive. A position-based scheme is employed to launch the writing of servo spirals from a location that can be precisely determined without a high-accuracy counter or other timing device. Instead, by selecting start locations for servo spirals that are not constrained to a single radial position, each servo spiral can be launched from a launch point that is disposed on a pre-existing coarse guide spiral. Consequently, the servo spiral is launched from the launch point in response to a write head crossing the preexisting coarse guide spiral, rather than in response to a particular timing counter value.

A method of writing a servo spiral on a recording surface of a magnetic storage disk, according to an embodiment, includes the steps of controlling the write head to move to a first write start position on a recording surface of the magnetic storage device and write a first fine reference spiral therefrom, and controlling the write head to move to a second write start position on the recording surface on which the first fine reference spiral is written and write a second fine reference spiral therefrom, wherein the first and second write start positions are at different radial locations.

A data storage device, according to an embodiment, comprises a data storage disk with a recording surface and a controller. The controller is configured to control the write head to move to a first write start position on a recording surface of the magnetic storage device and write a first fine reference spiral therefrom, and control the write head to move to a second write start position on the recording surface on which the first fine reference spiral is written and write a second fine reference spiral therefrom, wherein the first and second write start positions are at different radial locations.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
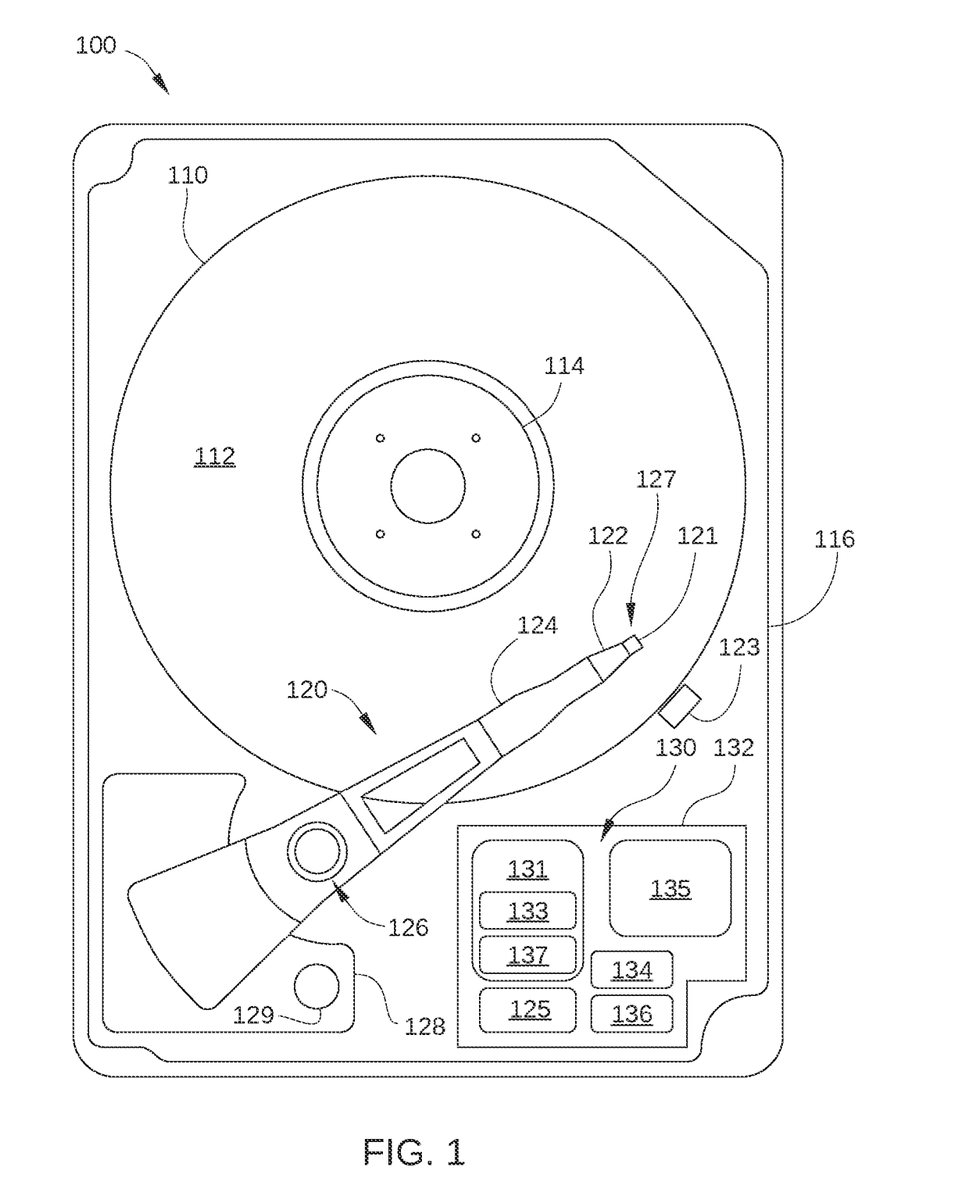
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base 116. An actuator arm assembly 120 is also mounted on base 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base 116, actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk 110 and is configured to unload read/write head 127 from storage disk 110. Typically, at the beginning of a self servo writing (SSW) process, actuator arm assembly 120 is pushed against ID crash stop 129, so that ID crash stop 129 may serve as a position reference at the start of the SSW process.

For clarity, HDD 100 is illustrated with a single storage disk 110 and a single actuator arm assembly 120. In practice, HDD 100 includes multiple storage disks and multiple actuator arm assemblies. In addition, each side of storage disk 110 generally has a corresponding read/write head (similar to read/write head 127) associated therewith and coupled to a flexure arm (similar to flexure arm 122).

When data are transferred to or from storage disk 110, actuator arm assembly 120 sweeps an arc between the ID and the OD of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW, position and timing information are provided to the disk drive servo system of HDD 100 so that HDD 100 can write servo wedges onto storage disk 110 with the necessary precision for proper operation of HDD 100. Servo wedges generally contain servo information that is located in servo sectors of the concentric data storage tracks on storage disk 110 and is read by the read/write head 127 during read and write operations to position the read/write head 127 above a desired data storage track. The position and timing information that enable the internal servo system of HDD 100 to perform SSW is typically in the form of reference spiral tracks written on storage disk 110 and referred to as "servo spirals" or "fine guide spirals." Fine guide spirals may be written using external equipment, such as a media writer or a servo writing machine. According to some embodiments, fine guide spirals may instead be written on storage disk 110 in an in-drive spiral write process. In such embodiments, the in-drive spiral write process uses coarse guide spirals that have been previously written on one or more recording surfaces of the multiple storage disks 100 of HDD 100. One embodiment of such coarse guide spirals is illustrated in FIG. 2.

Figure 2:
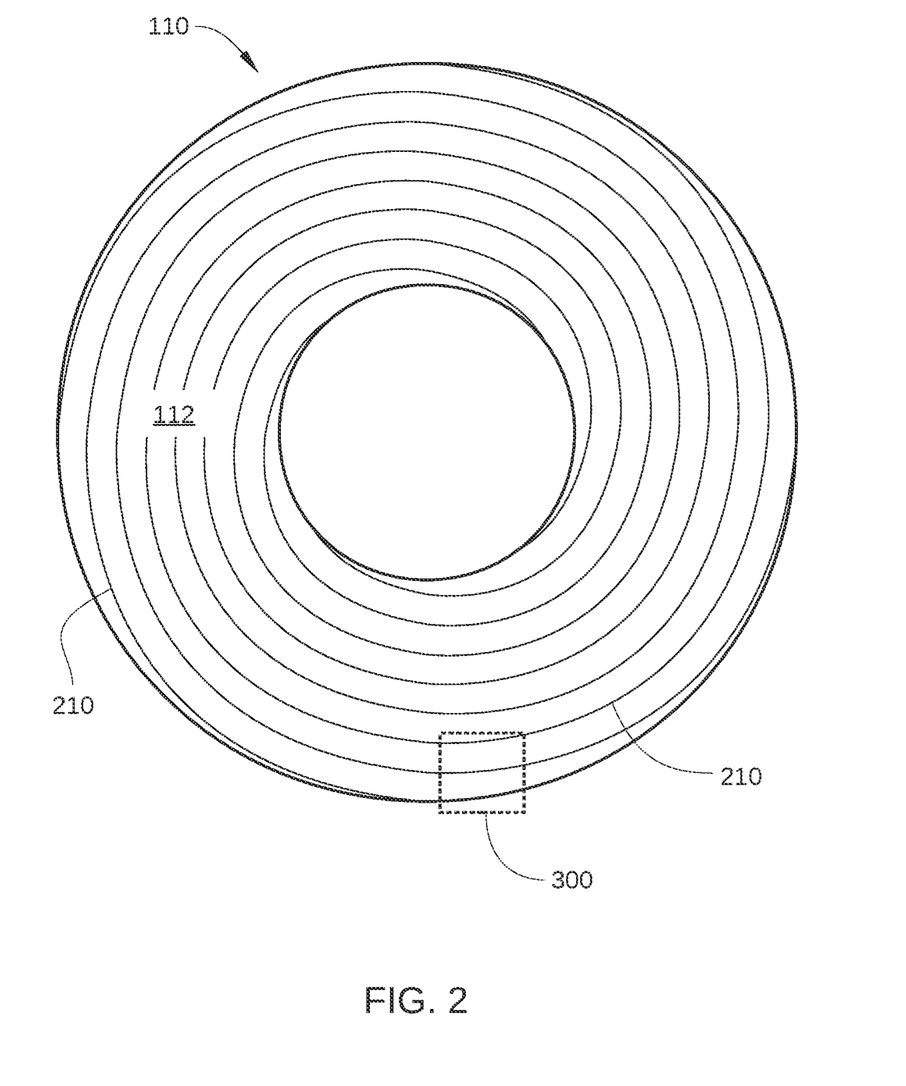
FIG. 2 illustrates one of the storage disks of the hard disk drive of FIG. 1 having coarse guide spirals written thereon.

FIG. 2 illustrates one of storage disks 110 prior to undergoing an in-drive spiral write process, according to one embodiment. As shown, storage disk 110 has a plurality of coarse guide spirals (CGSs) 210 written thereon that are circumferentially spaced from adjacent CGSs 210. CGSs 210 may be written or otherwise formed on surface 112 of storage disk 110 by any technically feasible approach or combination of approaches. For example, in some embodiments, CGSs 210 are "bootstrap spirals," which are servo spirals written onto a substantially blank surface 112 of storage disk 110 using read/write head 127 and the servo system of HDD 100. Various in-drive procedures are known in the art for writing bootstrap spirals on surface 112, including the use of open-loop and/or closed-loop control of read/write head 127. Alternatively, CGSs 210 may be formed on surface 112 using external equipment, such as being magnetically printed or otherwise transferred onto surface 112.

According to some embodiments, CGSs 210 are employed as coarse guide spirals that enable the generation of fine guide spirals (not shown) using closed-loop control in the servo system of HDD 100. That is, fine guide spirals can be written while the servo system of HDD 100 uses closed-loop tracking of CGSs 210. Fine guide spirals are more closely spaced and accurately positioned servo spirals than CGSs 210, and may be used for the SSW process, or to generate a larger number of fine servo spirals (e.g., on the order of several hundred) that are in turn used for the SSW process. It is noted that the number of CGSs 210 written on storage disk 110 prior to the SSW process may be larger than that shown in FIG. 2, for example 10, 20, 30, or more.

Figure 3:
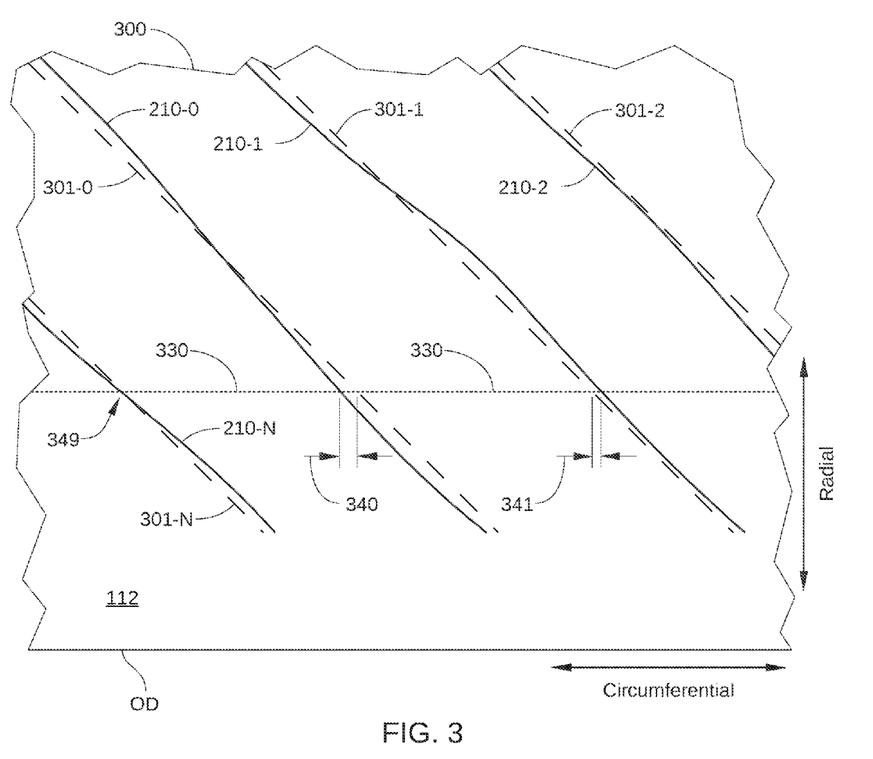
FIG. 3 is a schematic illustration of a portion of a storage disk, indicated in FIG. 2, prior to a fine guide spiral write process, according to one embodiment.

FIG. 3 is a schematic illustration of a portion 300 of storage disk 110, indicated in FIG. 2, prior to an in-drive spiral write process, according to one embodiment. Portion 300 is disposed at the outer diameter (OD) of storage disk 110, and a plurality of coarse guide spirals (CGSs) are formed on surface 112. In the embodiment illustrated in FIG. 3, the N+1 total CGSs on surface 112 include CGSs 210-0 to 210-N, where N maybe have a value between about five and fifty. Displacement horizontally in FIG. 3 corresponds to circumferential displacement, while displacement vertically in FIG. 3 corresponds to radial displacement.

Also included in FIG. 3 are a plurality of N+1 ideal spiral paths (301-0 to 301-N) that correspond to CGSs 210-0 to 210-N, respectively. Each of ideal spiral paths 301 indicates an ideal path for the location of a corresponding CGS. Ideal spiral paths are generally employed in position and timing calculations associated with SSW by HDD 100 rather than the actual locations of CGSs 210, since CGSs 210 may not be not formed on surface 112 with sufficient precision for the SSW process. Specifically, CGSs 210 may not be formed on surface 112 with sufficiently constant and uniform slope from ID to OD of storage disk 110 for facilitating a robust and error-free SSW process. In addition, CGSs 210 may not be formed with a uniform and constant circumferential spacing from adjacent CGSs 210. Consequently, at any particular radial location 330 on surface 112, there is a circumferential offset between each ideal spiral path 301 and the corresponding CGS 210. For example, at radial location 330, there is a circumferential offset 340 between ideal spiral path 301-0 and CGS 210-0, a circumferential offset 341 between ideal spiral path 301-1 and CGS 210-1, and a circumferential offset 349 (of essentially zero circumferential offset) between ideal spiral path 301-N and CGS 210-N.

Each of ideal spiral paths 301 may be determined based on circumferential offsets associated with the spiral path 301 at a plurality of radial locations. For example, ideal spiral path 301-1 may be determined based on a circumferential offset 341 at radial location 330 and on a plurality of additional circumferential offsets (not shown), each associated with CGS 210-1 at a different radial location. In some embodiments, the circumferential offset at a particular radial location for some or all of CGSs 210 is determined in one operation. Specifically, read/write head 127 of HDD 100 is servoed over a particular radial location (e.g., radial location 330) for multiple revolutions of storage disk 110, using CGSs 210 for position and timing. The circumferential offset at the current radial location can then be determined for each CGS 210 relative to each ideal spiral path 301, where each circumferential offset is selected so that ideal spiral paths 301 are all equally spaced from each other at the current radial location. Any technically feasible technique or algorithm may be used to select the circumferential offsets. Repeating this process for a plurality of radial locations can determine sufficient circumferential offsets for each CGS 210 to enable generation of ideal spiral paths 301.

Suitable techniques for determining circumferential offsets between CGSs 210 and ideal spiral paths 301 include known techniques for measuring the written-in repeatable runout typically associated with each track of a disk drive. Written-in repeatable runout is the offset between a desired track centerline and the actual position of the servo bursts for the track on the disk surface. Such techniques produce compensation values for each servo burst that allow the servo system of a disk drive to substantially ignore this offset and follow a more ideal circular path. One of skill in the art, upon reading this disclosure, can readily apply such techniques to the determination of circumferential offsets between CGSs 210 and ideal spiral paths 301. Alternatively, any other suitable algorithm may be used to determine the circumferential offsets described herein.

Figure 4:
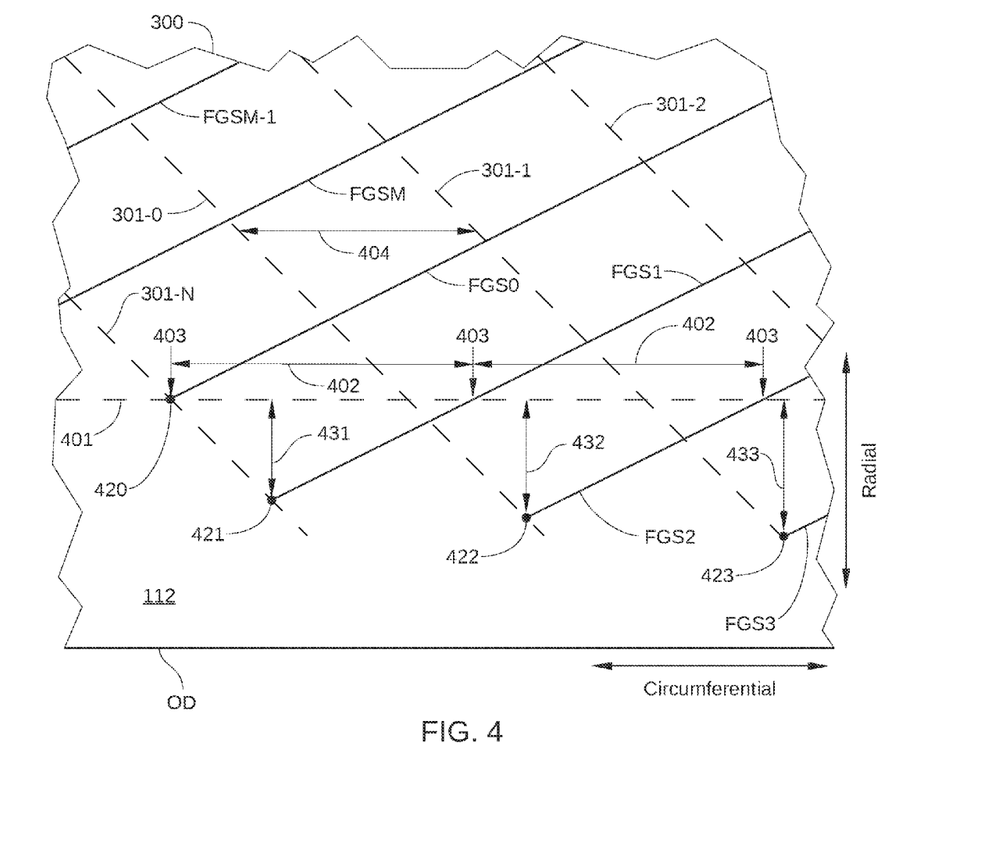
FIG. 4 is a schematic illustration of the portion of the storage disk indicated in FIG. 2 after undergoing a fine guide spiral write process, according to one embodiment.

FIG. 4 is a schematic illustration of portion 300 after undergoing an in-drive spiral write process, according to one embodiment. As shown, after an in-drive spiral process, M+1 fine guide spirals (FGSs) are written on surface 112, including FGS0, FGS1 FGS2, FGS3, . . . FGSM−1, and FGSM. Each FGS is written on surface 112 starting from a write start position, or "launch point." The write start position for FGS0 is a launch point 420; the write start position for FGS1 is a launch point 421; the write start position for FGS2 is a launch point 422; and the write start position for FGS3 is a launch point 423. The write start positions for FGSM−1 and FGSM are not shown in FIG. 4. Because, according to some embodiments, ideal spiral paths 301 are employed in the determination of FSG launch points rather than CGSs 210, CGSs 210 are omitted from FIG. 4. In some embodiments, the value of M is significantly larger than N, for example three to ten times as large as the value of N, or more.

In conventional HDDs, the launch points for FGSs are typically located at a single radial location, such as an OD launch track 401. The specific launch point for each FGS along OD launch track 401 is determined based on a precisely measured time interval that has transpired since a write head has passed over a previously written FGS launch point, so that the FGSs are evenly spaced along OD launch track 401. By contrast, in some embodiments, the write start positions for FGS0-FGSM are located at multiple radial locations. Thus, launch point 420 for FGS0 has substantially no radial offset from OD launch track 401, launch point 421 for FGS1 has a radial offset 431 from OD launch track 401, launch point 422 for FGS2 has a radial offset 432 from OD launch track 401, and launch point 423 for FGS3 has a radial offset 433 from OD launch track 401. In some embodiments, radial offset 431, 432, and 433 may be associated with multiple launch points, for example when the radial offset for the launch points of FGS0-FGSM have "wrapped" back to zero offset.

As shown, each of radial offsets 431-433 may have a different non-zero value, and may be positive as shown in FIG. 4 or even negative. In addition, each of launch points 421-423 is disposed on one of ideal spiral paths 301. By selecting an appropriate value for each of radial offsets 431-433, and assuming that each FGS will be written with the same constant slope (e.g., ratio of radial displacement to circumferential displacement, or any other applicable definition of "slope" or "gradient"), the launch point for each FSG can be disposed on an ideal spiral path 301. Furthermore, the value for each of radial offsets 431-433 is selected so that each FGS written on surface 112 is equally spaced circumferentially from each adjacent FGS. For example, when each FGS is equally spaced in this fashion, an FGS radial spacing 402 is substantially equal for each FGS on surface 112, where FGS radial spacing 402 is defined as the radial spacing between the crossing points 403 at which each FGS crosses OD launch track 401 (or any other particular radial location on surface 112).

Any suitable algorithm may be used to determine the value of radial offsets for each FGS to be written, i.e., FGS0-FGSM. In some embodiment, the value of each of radial offsets 431-433 may be determined with the following algorithm:

Radial Offset=(Spacing$_{FGS}$*M)−(CGS$_{Launch}$*Spacing$_{CGS}$)*(1/L+1)*Slope$_{CGS}$,
where:

Spacing$_{FGS}$=FGS radial spacing 402; M=the current FGS number to be written; CGS$_{Launch}$=(Spacing$_{FGS}$*M)/Spacing$_{CGS}$; Spacing$_{CGS}$=CGS radial spacing 404 in FIG. 4; and L=Slope$_{CGS}$/Slope$_{FGS}$. Thus, given a target path for each FGS to be written (i.e., a slope and a desired circumferential separation from adjacent FGSs), a known number of FGSs to be written, and a slope associated with ideal spiral paths 301, a launch point for each FGS to be written can be determined, where each launch point is disposed on an ideal spiral path.

Figure 5:
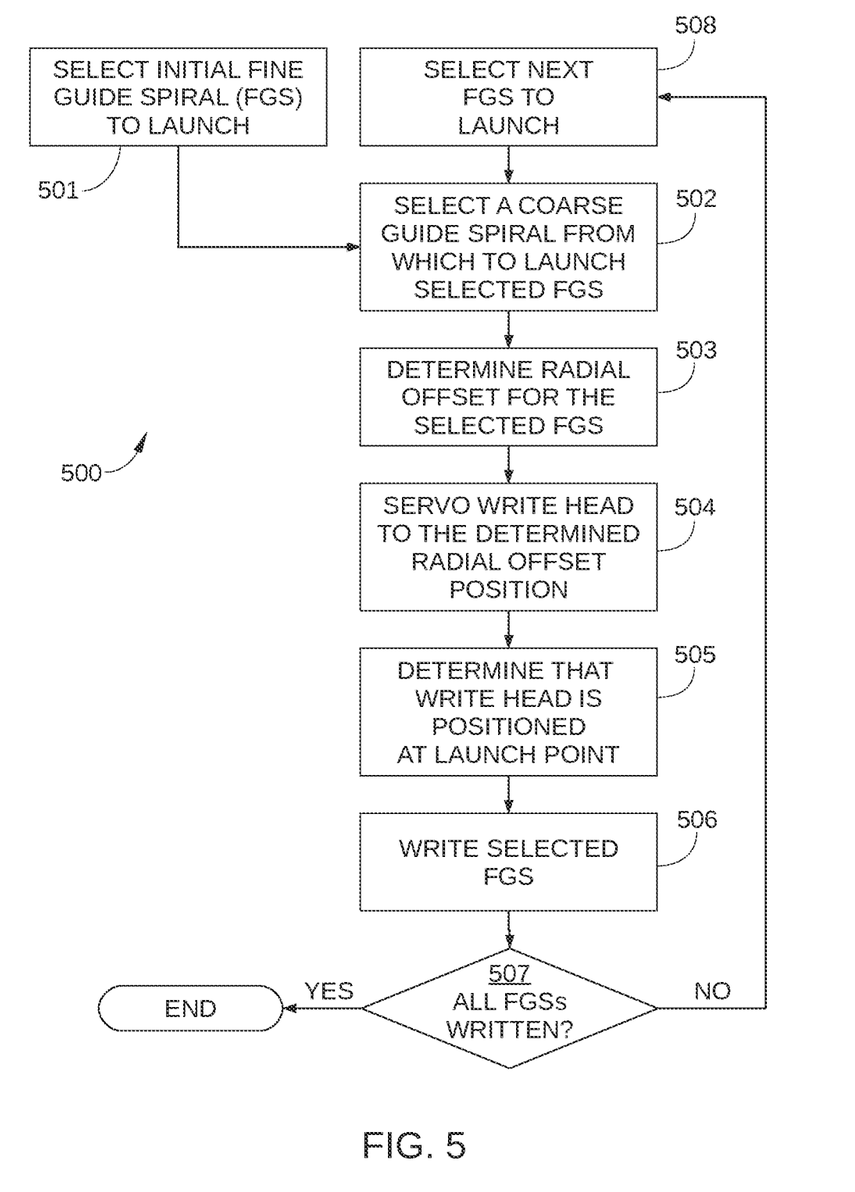
FIG. 5 sets forth a flowchart of method steps for writing a servo spiral on a recording surface of a magnetic storage disk, according to an embodiment.

FIG. 5 sets forth a flowchart of method steps for writing a servo spiral on a recording surface of a magnetic storage disk, such as hybrid HDD 100, according to an embodiment. Although the method steps are described in conjunction with HDD 100 in FIGS. 1-4, persons skilled in the art will understand that the method steps may be performed with other data storage devices. The control algorithms for the method steps may reside in and/or be performed by microprocessor-based controller 133, flash manager device 136, and/or any other suitable control circuit or system.

Prior to the method steps, a number of CGSs 210 are formed on surface 112 of storage disk 110, for example 10, 20, 30 or more. As noted previously, CGSs 210 may be written onto surface 112 by HDD 100 itself or may be otherwise formed on surface 112. In addition, the number of FGSs to be written on surface 112 is generally known prior to the method steps. Furthermore, in some embodiments, the ideal spiral paths 301 may be determined prior to the method steps. Alternatively, ideal spiral paths 301 may instead be determined as part of the method steps, as described below. In either case, ideal spiral paths 301 may be determined in total from OD to ID of surface 112, or only a portion of each ideal spiral path 301 may be determined, for example near the OD of surface 112, to facilitate accurate launch points for writing FGSs.

As shown, method 500 begins at step 501, where microprocessor-based controller 133 selects an initial FGS to write. In some embodiments, microprocessor-based controller 133 initially selects an FGS having a launch point that is disposed on a specific radial location, such as OD launch track 401. For example, when microprocessor-based controller 133 uses the above-described algorithm for determining a radial offset for the launch point of each FGS, microprocessor-based controller 133 selects FSG0 as the first FGS to be written. It is noted that when M=0, the radial offset for the FSG also equals 0. In step 502, microprocessor-based controller 133 selects an ideal spiral path 301 (or in some embodiments, a CGS 210) from which to launch writing of the FGS selected in step 501. In some embodiments, the CGS 210 or ideal spiral path 301 that is selected in step 502 intersects with the target path of the FGS to be written near the OD of surface 112, for example at or near OD launch track 401 or any other radial track location near the OD of surface 112.

In step 503, microprocessor-based controller 133 determines, for the FGS selected in step 501 (or step 508 for the FGS selected after the initial selection, both referred to hereinafter as the "selected FGS"), a radial offset from a particular radial location, e.g., radial offset 431, radial offset 432, or radial offset 433 from OD launch track 401. As described above in conjunction with FIG. 4, the radial offset may be determined based on the desired circumferential spacing between FGSs, the current FGS number (e.g., from 0 to M), the circumferential spacing between ideal spiral paths 301 (or an average spacing between CGSs 210), a desired slope of the FGSs to be written, and a slope of ideal spiral paths 301 (or an average slope of CGSs 210). It is noted that determination of the radial offset in step 503 is a relatively simple computation, and can be performed "on-the-fly." That is, the computation can be performed after writing of the immediately preceding FGS has been completed. Alternatively, determination of the radial offsets for some or all of the FGSs to be written may be performed prior to method 500 and stored in a suitable location in HDD 100, such as RAM 134.

In some embodiments, as part of step 503, the slope of and the circumferential spacing between ideal spiral paths 301 at or near the radial location of the launch point for the selected FGS is determined. For example, read/write head 127 may servo over a particular radial location near the OD of surface 112, such as OD launch track 401, or over multiple radial locations near the OD of surface 112. In this way, a suitable algorithm may determine the slope, circumferential spacing, and circumferential location of ideal spiral paths 310 near the radial location the launch point of the FGS to be written, based on measurements of CGSs 210 over multiple rotations of storage disk 110. Alternatively, such information may be determined for ideal spiral paths 310 prior to method 500. In yet other embodiments, a suitable algorithm may determine the slope, circumferential spacing, and circumferential location of each ideal spiral path 301 prior to method 500 and over the length of each ideal spiral path 301.

In step 504, microprocessor-based controller 133 controls read/write head 127 to move to the radial location that corresponds to the particular radial location (e.g., OD launch track 401) modified by the radial offset determined in step 503. Thus, read/write head 127 moves to a radial location that corresponds to the radial location of the desired launch point for the selected FGS selected. For example, microprocessor-based controller 133 may servo read/write head 127 to the radial location that corresponds to the radial offset determined in step 503 using the timing and position information provided by CGSs 210. Microprocessor-based controller 133 then continues to servo read/write head 127 over the radial location.

In step 505, microprocessor-based controller 133 determines that read/write head 127 is positioned at the launch point for the selected FGS. Thus, because the launch point is disposed on the ideal spiral path 301 corresponding to a particular CGS 210, microprocessor-based controller 133 may make such a determination by detecting that read/write head 127 has passed over the particular CGS 210. In step 506, microprocessor-based controller 133 begins writing the selected FGS at the desired slope and starting at the launch point associated therewith. Microprocessor-based controller 133 generally uses CGS 210 and/or ideal spiral paths 301 for timing and position information while writing the FGS along the target path. In step 507, microprocessor-based controller 133 determines whether all FGSs for surface 112 have been written. If no, method 500 proceeds to step 508 and the next FGS is written on surface 112; if yes, method 500 ends. In step 508, microprocessor-based controller 133 selects the next FGS to be written on surface 112. In some embodiments, microprocessor-based controller 133 increments M by 1 when selecting the next FGS to be written, while in other embodiments, any of the remaining FGSs remaining to be written (of the total M+1 FGSs) may be selected.

Because the launch point of each FGS is positioned on or near an ideal spiral path 301, precise timing is not needed to launch writing of an FGS accurately when using method 500. Furthermore, an additional interrupt is not needed to initiate writing of an FGS. Instead, a spiral switch mode interrupt may be used that is generated by detection of the ideal spiral path 301 associated with the launch point for the FGS to be written. In addition, for each FGS written on surface 112, after read/write head 127 leaves the launch point in step 506, the next ideal spiral path 301 is crossed after substantially the same time interval. Because ideal spiral paths 301 are used for closed-loop control of the position of read/write head 127, constant transient behavior is more readily maintained when the first (and second) position feedback signals (i.e., the crossing of the first few ideal spiral paths 301 after launching the writing) occurs at consistently the same time. Consequently, locating launch points for each FGS on an ideal spiral path 301 also facilitates accurate closed-loop control of read/write head 127 when beginning to write each FGS.

In the embodiments described above, CGSs 210 and FGS0-FGSM are written on a single surface 112 of HDD 100. In such embodiments, writing of FGS0-FGSM while servoing on SCGs 201 (and/or ideal spiral paths 301) generally involves reading and writing with the same read/write head 127 of HDD 100 simultaneously. While feasible, this procedure may have a higher risk of errors due to increased interference associated with the simultaneous read/write process. In other embodiments, CGSs 210 are written on one surface 112 of HDD 100, while FGS0-FGSM are written on a different recording surface of HDD 100, such as a surface 112 of a different storage disk 110. One such embodiment is illustrated in FIG. 6.

Figure 6:
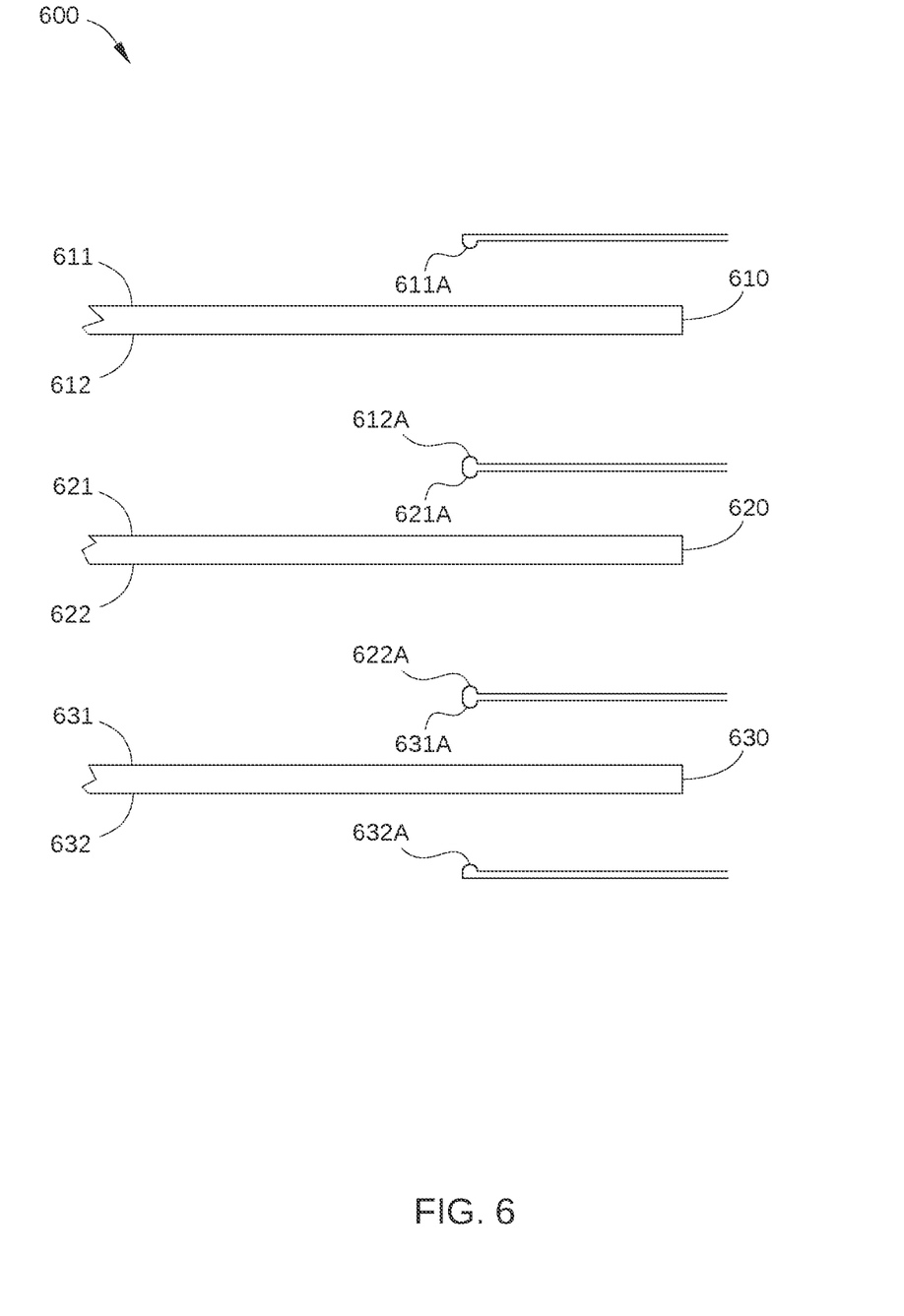
FIG. 6 schematically illustrates a partial side-view of a hard disk drive configured with multiple storage disks and multiple read/write heads, according to an embodiment.

FIG. 6 schematically illustrates a partial side-view of a HDD 600 configured with multiple storage disks 610, 620, and 630, and multiple read/write heads, according to an embodiment. Each read/write head of HDD 600 is associated with one surface of one of storage disks 610, 620, and 630. Specifically, read/write heads 611A, 612A, 621A, 622A, 631A, 632A are associated with disk surfaces 611, 612, 621, 622, 631, and 632, respectively. HDD 600 is otherwise substantially similar in configuration and operation to HDD 100. In some embodiments, CGSs 210 may be written on one of the six surfaces of HDD 100, e.g., disk surface 621, while FGS0-FGSM are written on a different one of the six surface of HDD 100, such as disk surface 622. Once FGS0-FGSM are written on disk surface 622, servo wedges can be written on all disk surfaces 611, 612, 621, 622, 631, and 632. Using the timing and position information read from FGS0-FGSM, one read/write head of HDD 600 can servo precisely over a radial position on disk surface 622 corresponding to a particular concentric data storage track. Simultaneously, another read/write head of HDD 600 can write servo wedges for the radial position on another of disk surfaces 611, 612, 621, 631, or 632.

In sum, embodiments described herein provide systems and methods for writing reference spirals on a recording surface of a hard disk drive. By writing fine guide spirals from a launch point that is disposed on a pre-existing coarse guide spiral, writing of the fine guide spiral can be launched in response to a write head crossing the pre-existing coarse guide spiral, rather than in response to a precisely timed event. To enable launch points being disposed on pre-existing coarse guide spirals, launch points are not all located at the same radial position on the recording surface.

While the foregoing is directed to embodiments of the present invention, other and further embodiments of the invention may be devised without departing from the basic scope thereof, and the scope thereof is determined by the claims that follow.

We claim:
1. A method of writing fine reference spirals on a recording surface of a magnetic storage device based on locations of coarse reference spirals previously written on a recording surface of the magnetic storage device, said method comprising:
 calculating a radial position for a first write start position based on a slope of a first coarse reference spiral and a target slope of a first fine reference spiral;
 controlling the write head to move to the first write start position on a recording surface of the magnetic storage device and write the first fine reference spiral therefrom; and
 controlling the write head to move to a second write start position on the recording surface on which the first fine reference spiral is written and write a second fine reference spiral therefrom,
 wherein the first and second write start positions are at different radial locations.
2. The method of claim 1, wherein the recording surface on which the coarse reference spirals are written is a different recording surface of the magnetic storage device than the recording surface on which the first write start position and the second write start position are disposed.
3. The method of claim 2, further comprising:
 controlling an additional write head to move to a third write start position on an additional recording surface of the magnetic storage device and write a third fine reference spiral therefrom; and
 controlling the additional write head to move to a fourth write start position on the additional recording and write a fourth fine reference spiral therefrom,
 wherein the third and fourth write start positions are at different radial locations.
4. The method of claim 2, further comprising:
 controlling an additional write head to move to a third write start position on the recording surface on which the coarse reference spirals are written and write a third fine reference spiral therefrom; and
 controlling the additional write head to move to a fourth write start position on the recording surface on which the coarse reference spirals are written and write a fourth fine reference spiral therefrom,
 wherein the third and fourth write start positions are at different radial locations.
5. The method of claim 1, further comprising calculating a radial position for the second write start position based on a slope of a second coarse reference spiral and a target slope of the second fine reference spiral.
6. The method of claim 5, wherein calculating the radial position for the second write start position is performed after controlling the write head to write the first fine reference spiral.
7. The method of claim 1, wherein the first write start position corresponds to an intersection point at which an ideal spiral path corresponding to a first coarse reference spiral crosses a target path for the first fine reference spiral, and the second write start position corresponds to an intersection point at which an ideal spiral path corresponding to a second coarse reference spiral crosses a target path for the second fine reference spiral.
8. The method of claim 1, further comprising:
 selecting a nominal radial track position,
 wherein the first write start position corresponds to an intersection point of the nominal radial track position and one of the coarse reference spirals.
9. The method of claim 1, wherein controlling the write head to move to the first write start position comprises causing the write head to servo over a radial location corresponding to the first write start position using the coarse reference spirals.
10. The method of claim 1, wherein the radial location corresponding to the first write start position also corresponds to an additional write start position for an additional fine reference spiral.
11. A data storage device, comprising:
 a data storage disk with a recording surface; and
 a controller configured to:
 based on locations of coarse reference spirals previously written on the recording surface of the data storage disk, calculate a radial position for a first write start position based on a slope of a first coarse reference spiral and a target slope of a first fine reference spiral;
 control the write head to move to the first write start position on a recording surface of the magnetic storage device and write the first fine reference spiral therefrom; and
 control the write head to move to a second write start position on the recording surface on which the first fine reference spiral is written and write a second fine reference spiral therefrom,
 wherein the first and second write start positions are at different radial locations.
12. The data storage device of claim 11, wherein the recording surface on which the coarse reference spirals are written is a different recording surface of the magnetic storage device than the recording surface on which the first write start position and the second write start position are disposed.

13. The data storage device of claim 12, wherein the controller is further configured to:
  control an additional write head to move to a third write start position on an additional recording surface of the magnetic storage device and write a third fine reference spiral therefrom; and
  control the additional write head to move to a fourth write start position on the additional recording and write a fourth fine reference spiral therefrom,
  wherein the third and fourth write start positions are at different radial locations.

14. The data storage device of claim 12, wherein the controller is further configured to:
  control an additional write head to move to a third write start position on the recording surface on which the coarse reference spirals are written and write a third fine reference spiral therefrom; and
  control the additional write head to move to a fourth write start position on the recording surface on which the coarse reference spirals are written and write a fourth fine reference spiral therefrom,
  wherein the third and fourth write start positions are at different radial locations.

15. The data storage device of claim 11, wherein the controller is further configured to calculate a radial position for the second write start position based on a slope of a second coarse reference spiral and a target slope of the second fine reference spiral.

16. The data storage device of claim 15, wherein calculating the radial position for the second write start position is performed after controlling the write head to write the first fine reference spiral.

17. The data storage device of claim 11, wherein the first write start position corresponds to an intersection point at which an ideal spiral path corresponding to a first coarse reference spiral crosses a target path for the first fine reference spiral, and the second write start position corresponds to an intersection point at which an ideal spiral path corresponding to a second coarse reference spiral crosses a target path for the second fine reference spiral.

18. The data storage device of claim 11, wherein the data storage disk has a plurality of the fine reference spirals written on the recording surface thereof and write start positions of adjacent ones of the fine reference spirals are at different radial positions.

19. A data storage device, comprising:
  a data storage disk with a recording surface; and
  a controller configured to:
  control the write head to move to a first write start position on a recording surface of the magnetic storage device and write a first fine reference spiral therefrom; and
  control the write head to move to a second write start position on the recording surface on which the first fine reference spiral is written and write a second fine reference spiral therefrom,
  wherein the first fine reference spiral and the second fine reference spiral are consecutively written spirals, and the first and second write start positions are at different radial locations.

20. The data storage device of claim 19, wherein the controller is further configured to
  control the write head to move to a third write start position on the recording surface on which the first and second fine reference spirals are written and write a third fine reference spiral therefrom,
  wherein the second and third fine reference spirals are consecutively written spirals, and the second and third write start positions are at different radial locations.

* * * * *